(12) United States Patent
Tsou et al.

(10) Patent No.: US 9,337,739 B2
(45) Date of Patent: May 10, 2016

(54) POWER CONTROLLER WITH OVER POWER PROTECTION

(71) Applicant: Leadtrend Technology Corporation, Hsinchu (TW)

(72) Inventors: Ming Chang Tsou, Hsinchu (TW); Meng Jen Tsai, Hsinchu (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/077,479

(22) Filed: Nov. 12, 2013

(65) Prior Publication Data
US 2014/0146581 A1 May 29, 2014

(30) Foreign Application Priority Data

Nov. 27, 2012 (TW) .............................. 101144253 A

(51) Int. Cl.
*H02H 7/125* (2006.01)
*H02M 3/335* (2006.01)
*H02M 1/32* (2007.01)

(52) U.S. Cl.
CPC ............ *H02M 3/33507* (2013.01); *H02M 1/32* (2013.01)

(58) Field of Classification Search
CPC .............. H02M 3/338; H02M 3/3385; H02M 3/33569; H02M 3/335; H02M 3/33523; H02M 3/33592; H02M 3/33507; H02M 1/32; H02M 7/062
USPC ............. 363/18–23, 50, 52, 53, 21.01, 21.02, 363/21.03, 21.04, 21.05, 21.06, 21.07, 363/21.08, 21.09, 21.1, 21.11, 21.12, 21.13, 363/21.14, 21.15, 21.16, 21.17, 21.18, 1.06, 363/1.14, 215; 323/241, 283, 322
See application file for complete search history.

(56) References Cited

U.S. PATENT DOCUMENTS

| | | | |
|---|---|---|---|
| 5,663,874 A * | 9/1997 | Mader et al. ............... | 363/21.14 |
| 6,061,257 A * | 5/2000 | Spampinato et al. ...... | 363/21.13 |
| 6,373,724 B2 * | 4/2002 | Nagai et al. .................... | 363/20 |
| 6,396,718 B1 * | 5/2002 | Ng et al. .................... | 363/21.07 |
| 7,149,098 B1 * | 12/2006 | Chen .......................... | 363/56.09 |
| 7,486,493 B2 * | 2/2009 | Yang ................. | H02M 3/33507 361/91.1 |
| 7,916,506 B2 * | 3/2011 | Zhang et al. ............... | 363/21.02 |
| 2010/0165676 A1 * | 7/2010 | Fang et al. ....................... | 363/50 |
| 2011/0211281 A1 * | 9/2011 | Huang et al. ................... | 361/18 |
| 2013/0088206 A1 * | 4/2013 | Tsou et al. .................... | 323/234 |

* cited by examiner

*Primary Examiner* — Adolf Berhane
*Assistant Examiner* — Alex Torres-Rivera
(74) *Attorney, Agent, or Firm* — McClure, Qualey & Rodack, LLP

(57) ABSTRACT

A power controller with over power protection is disclosed, capable of providing a pulse-width-modulation signal to control a power switch. The power controller comprises a pulse width modulator, first and second oscillators, and an over power detector. The pulse width modulator generates the pulse-width-modulation signal. The first oscillator is coupled to the pulse width modulator, for determining a cycle time of the pulse-width-modulation signal. The second oscillator, independent from the first oscillator, determines a maximum over power duration. The over power detector detects the occurrence of an over power event. When the over power event lasts for the maximum over power duration, the pulse-width-modulation signal switches OFF the power switch constantly.

19 Claims, 2 Drawing Sheets

POWER CONTROLLER WITH OVER POWER PROTECTION

CROSS-REFERENCE TO RELATED APPLICATION

This application claims priority to and the benefit of Taiwan Application Series Number 101144253 filed on Nov. 27, 2012, which is incorporated by reference in its entirety.

BACKGROUND

The present disclosure relates generally to protection for power supplies, and more particularly, to over power protection for switched mode power supplies.

Power supplies are commonly necessary for most consumer electronic appliances, for converting the power from power grids or batteries to the power with specifications suitable for an appliance. Superior in compact product size and conversion efficiency, switched mode power supply, among all kinds of power supplies, is globally adopted, especially in the consumer markets.

A power supple need not only provide suitable voltage or current meeting the required specification, but also prevent any accident or risk from occurring if abnormal events happen. These events, to name a few, include events of over power, over output voltage, overcurrent, and over temperature. Protection method to deal with these events must be considered during circuit design for a power supply.

Printers or notebook computers usually need extra high power output for a very short period of time. Most of time a printer, for example, operates in a standby mode or a signal transmission mode, in which all the mechanical devices of the printer stay static and the printer consumes very low or moderate power. Nevertheless, high power consumption is needed when a printer moves lots of mechanical devices or parts to perform printing, which common lasts only for a short period of time. Accordingly, a power supply for a printer needs to supply low or moderate output power "normally" and high output power "in pulse". Two terms, including normal maximum power and peak power, are defined in this patent specification for a power supply, respectively referring to the maximum output power level it should supply when operating "normally", and the maximum output power level it could when needed to provide extra power "in pulse". It is costly effective to deem an occurrence of an over power event and trigger an corresponding protection response when a power supply continuously, for a period of time longer than expected, provides power more than the normal maximum power. U.S. Pat. No. 7,486,493, for example, discloses a switched mode power supply with over power protection.

In the specification of this patent application, devices or apparatuses with the same symbol refer to the devices or apparatuses with the same or similar function, structure, or characteristic. They might not be exactly the same, however. Their detail might not be restated in consideration of brevity, and could be understood or derived by a person skilled in the art according to the teaching herein.

SUMMARY

Embodiments of the present invention disclose a power controller with over power protection, capable of providing a pulse-width-modulation signal to control a power switch. The power controller comprises a pulse width modulator, first and second oscillators, and an over power detector. The pulse width modulator generates the pulse-width-modulation signal. The first oscillator is coupled to the pulse width modulator, for determining a cycle time of the pulse-width-modulation signal. The second oscillator, independent from the first oscillator, determines a maximum over power duration. The over power detector detects the occurrence of an over power event. When the over power event lasts for the maximum over power duration, the pulse-width-modulation signal switches OFF the power switch constantly.

Embodiments of the present invention disclose a control method for a switched mode power supply with a power switch. A pulse-width-modulation signal is provided to control the power switch. A first oscillation signal is provided for determining a cycle time of the pulse-width-modulation signal. The occurrence of an over power event is detected. A second oscillation signal independent from the first oscillation signal is provided to determine a maximum over power duration. It is detected whether the over power event lasts for the maximum over power duration. When the over power event lasts for the maximum over power duration, the power switch is constantly switched OFF.

BRIEF DESCRIPTION OF THE DRAWINGS

The invention can be more fully understood by the subsequent detailed description and examples with references made to the accompanying drawings, wherein.

DETAILED DESCRIPTION

Figure 1:
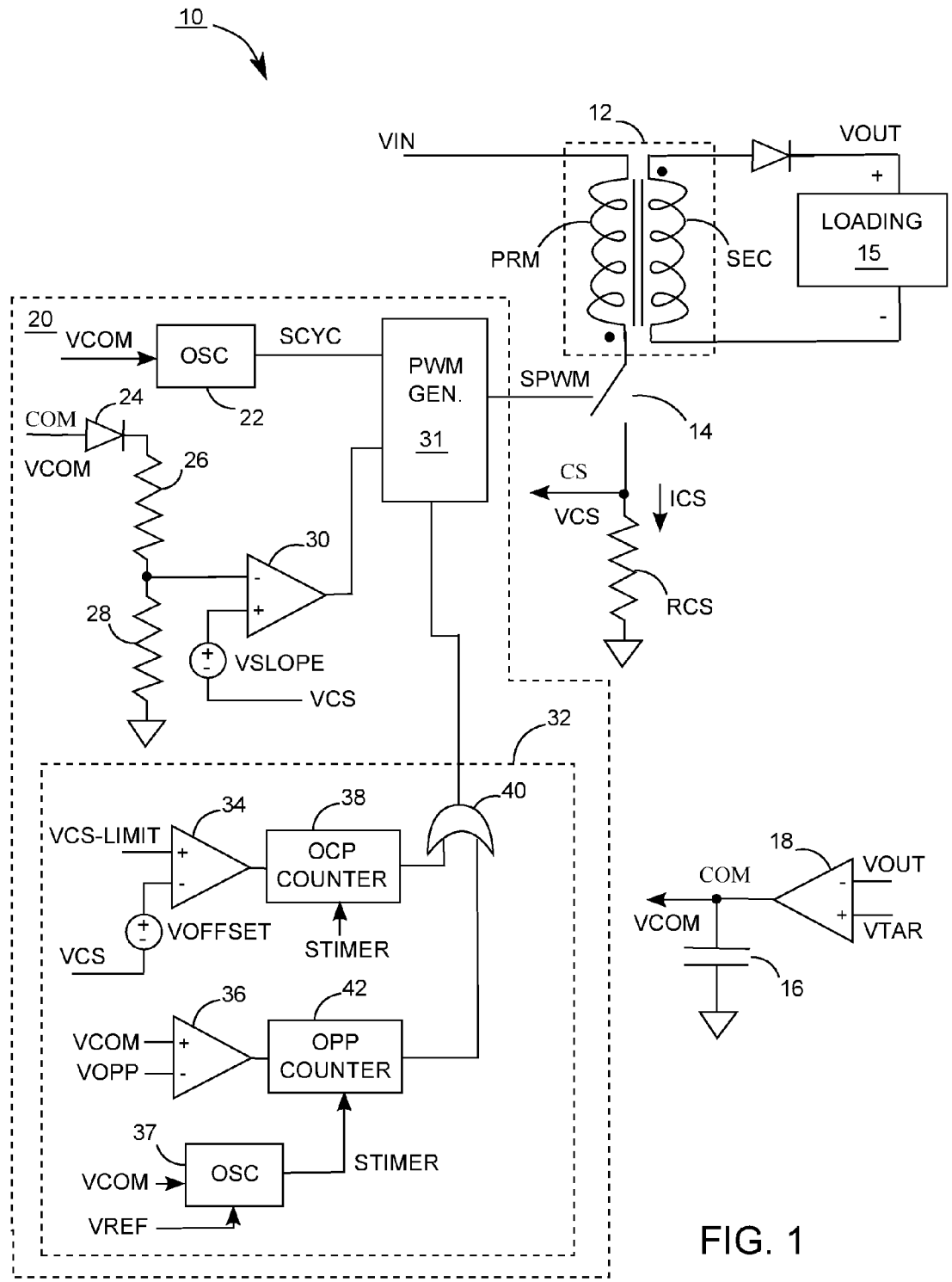
FIG. 1 demonstrates a switched mode power supply 10 with over power and overcurrent protection.

FIG. 1 demonstrates a switched mode power supply 10 with overpower and overcurrent protection. Even though the switched mode power supply 10 is a flyback power converter in topology, but this invention is not limited to. Embodiments of the invention could be a buck converter, or a booster, for example.

Line power source VIN could be generated by rectifying an alternative-current voltage source from power grids, whose peak voltage could be as high as 280V. The voltage waveform of line power source VIN could be M-shaped or substantially flat. A power switch 14 controls the current ICS flowing through the primary winding PRM of a transformer 12, where a current sense resistor RCS converts the current ICS to provide a current sense signal VCS at a node CS. In other words, the current sense signal VCS substantially represents the current ICS. When the power switch 14 is ON, performing a short circuit, the line power source VIN energizes the transformer 12, increasing the magnetic energy therein over time. When the power switch 14 is OFF, the transformer 12 deenergizes, releasing the stored magnetic energy through the secondary winding SEC to build up output power source VOUT and power a loading 15. According to the voltage difference between the output power source VOUT and a target voltage VTAR, an operational amplifier 18 drives a compensation capacitor 16, and builds a compensation voltage VCOM at a compensation node COM. Based on the compensation voltage VCOM, a power controller 20 provides pulse-width-modulation (PWM) signal SPWM, which periodically turns the power switch 14 ON and OFF. The power controller 20 provides a feedback loop, hoping to stabilize the output power source VOUT to be at the target voltage VTAR. For example, the higher the compensation voltage VCOM, the more the duty cycle of the PWM signal SPWM, and the more the output power the transformer 12 forwards to the output power source VOUT to power the loading 15. In other words, the compensation voltage VCOM is in association with the output power of the output power source VOUT. As the output power source VOUT is stabilized at the target voltage VTAR, a higher compensation voltage VCOM could imply a heavier loading 15 that the output power source VOUT is powering.

Control of the switched mode power supply 10 could be implemented by way of secondary side regulation (SSR) or primary side regulation (PSR). For SSR, the information or detection result at the secondary side is passed to the power controller 20 at the primary side via a photo coupler. In the opposite, PSC employs no photo coupler, but senses and regulates the voltage drop across an auxiliary winding at the primary side of the transformer 12 to indirectly influence the output power source VOUT.

In one embodiment of the invention, the power controller 20 has an oscillator 22, providing an oscillation signal SCYC, which periodically makes the PWM signal SPWM "1" in logic to turn ON the power switch 14. The oscillation signal SCYC, in other words, determines the beginning of an ON time TON when the power switch 14 is ON in a switch cycle of the power switch 14, and decides the switching frequency of the power switch. In another embodiment, the oscillation signal SCYC could determine the beginning of an OFF time TOFF when the power switch 14 is OFF in a switch cycle of the power switch 14. A cycle time TCYC of the power switch 14 consists of one ON time TON and one OFF time TOFF. The compensation voltage VCOM, after the voltage dropping by a diode 24 and the voltage dividing by resistors 26 and 28, limits the peak value of the current sense signal VCS. The current sense signal VCS ramps up when an ON time TON starts, and when it reaches the compensation voltage VCOM deducted by a slope-compensation voltage VSLOPE, the comparator 30 makes, via the signal path provided by a pulse width modulator 31, the PWM signal SPWM "0" in logic, turning OFF the power switch 14 and determining the beginning of an OFF time TOFF. In one embodiment of the invention, the slope-compensation voltage VSLOPE increases as the ON time TON increases.

In a protection module 32, functions of over power protection and overcurrent protection are provided. Comparators 34 and 36 are detectors for detecting the occurrences of an overcurrent event and an over power event, respectively. The oscillator 37 in the protection module 32 is independent to the oscillator 22, and provides, in response to compensation voltage VCOM and a certain level VREF, a clock signal STIMER for the protection module 32 to count or time.

The comparator 34 compares the current sense voltage VCS with a current limiting signal VCS-LIMIT. If the sum of the current sense voltage VCS and an offset signal VOFFSET exceeds the current limiting signal VCS-LIMIT, the comparator 34 treats it as an indication of the occurrence of an overcurrent event, and makes OCP counter 38 start to count based on the clock signal STIMER. The count result of the OCP counter represents the lasting of the overcurrent event, and the OCP counter 38 further checks if this overcurrent event lasts for a maximum overcurrent duration. If the overcurrent event vanishes before lasting for the maximum overcurrent duration, the OCP counter 38 stops counting and is reset, making its count result 0. If the OCP counter 38 finds the overcurrent event has lasted for 100 cycle times of the clock signal STIMER, an example of the maximum overcurrent duration, it makes, via logic gate 40, the PWM signal SPWM output from pulse width modulator 31 "0" in logic, constantly turning OFF the power switch 14 and therefore achieving overcurrent protection.

Analogously, the comparator 36 compares the compensation voltage VCOM with a preset over power voltage VOPP. If the compensation voltage VCOM exceeds a preset over power voltage VOPP, the comparator 36 treats it as an indication of the occurrence of an over power event, and a OPP counter 42 starts to count, based on the clock signal STIMER. If the OPP counter 42 finds the over power event has lasted for 1000 cycle times defined by the clock signal STIMER, an example of the maximum over power duration, the OPP counter 42 makes, via logic gate 40, the PWM signal SPWM output from pulse width modulator 31 "0" in logic, constantly turning OFF the power switch 14 and therefore achieving over power protection. Similarly, if the over power event vanishes before lasting for the maximum over power duration, the OPP counter 42 stops counting and is reset, making its count result 0. In one embodiment, the maximum over power duration is longer than the maximum overcurrent duration.

Figure 2:
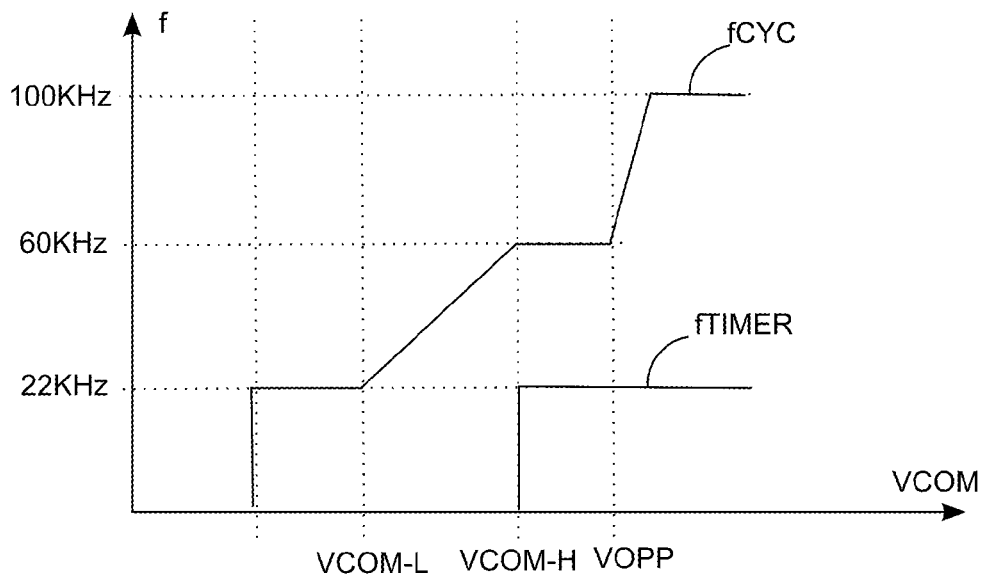
FIG. 2 demonstrates both the dependences of the frequency fCYC of the oscillation signal SCYC and the frequency fTIMER of the clock signal STIMER to the compensation voltage VCOM.

FIG. 2 demonstrates both the dependences of the frequency fCYC of the oscillation signal SCYC and the frequency fTIMER of the clock signal STIMER to the compensation voltage VCOM. When the loading 15 is light, or the compensation voltage VCOM is less than a predetermined voltage VCOM-L, the frequency fCYC is as low as 0 Hz or 22 KHz, letting the switched mode power supply 10 enjoy reduction in switching loss and increase in power conversion efficiency. When the compensation voltage VCOM is somehow between the predetermined voltages VCOM-L and VCOM-H, the frequency fCYC changes as the compensation voltage VCOM varies, and the relation therebetween can be expressed by a tilted straight line as shown in FIG. 2. If the compensation voltage VCOM is more than the predetermined voltage VCOM-H but less than the preset over power voltage VOPP, the frequency fCYC is fixed at about 60 KHz. For example, the switched mode power supply 10 could have a rating of a normal maximum power about 15 W, implying the switched mode power supply 10 outputs to the loading 15 a power of 15 W when the compensation voltage VCOM is about the preset over power voltage VOPP. Once the compensation voltage VCOM exceeds the preset over power voltage VOPP, the frequency fCYC quickly jumps to be as high as 100 KHz, as shown in FIG. 2. Under this high frequency fCYC of 100 KHz, the switched mode power supply 10 is capable of temporarily outputting peak power more than the normal maximum power, where in some embodiments the peak power might be twice the normal maximum power.

In some embodiments of the invention, only when the compensation voltage VCOM exceeds the certain level VREF then the oscillator 37 oscillates to provide the clock signal STIMER, and the frequency fTIMER of the clock signal STIMER is about a constant, independent to the compensation voltage VCOM. FIG. 2 demonstrates that the frequency fTIMER is about 22 KHz when the compensation voltage VCOM is larger than the predetermined voltage VCOM-H, and is about 0 Hz when the compensation voltage VCOM is below the predetermined voltage VCOM-H. As the oscillator 37 stops oscillating when the loading 15 is light or moderate, internal power consumption of the power controller 20 is reduced and therefore the power conversion efficiency could be increased.

Using the switched mode power supply 10 as a power supply for a printer, for example, the compensation voltage VCOM could be designed to be below the preset over power voltage VOPP when the printer is not printing and operates with a light or moderate loading. Once the printer starts printing, operating with a suddenly-heavy loading, the compensation voltage VCOM responses to the suddenly-heavy loading and therefore exceeds the preset over power voltage VOPP. The comparator 36 therefore treats it as an indication of the occurrence of an over power event, and the OPP counter 42 starts to count. If this over power event lasts too long, the count result exceeding the maximum over power duration, it deems something wrong happens to the printer, and an over power protection is correspondingly triggered to stop the switched mode power supply from power conversion. In case that the compensation voltage VCOM falls down below the preset over power voltage VOPP to vanish this over power event before the counting of the OPP counter 42 reaches the maximum over power duration, it implies that the duration of this over power event is reasonable, such that the OPP counter 42 is reset to have its count result "0", ready for timing a next over power event.

In one embodiment, the independency of the oscillator 37 from the oscillator 22 could render better precision in the maximum over power duration and the maximum overcurrent duration. As shown in FIG. 2, the value of the frequency fCYC that the oscillator 22 generates is not a constant and depends on the compensation voltage VCOM. If the oscillation signal SCYC with the frequency fCYC is used as a clock for timing, the actual duration of a predetermined count will vary along with the change of the compensation voltage VCOM. For example, 100 cycle times of the oscillation signal SCYC could become shorter if the compensation voltage VCOM and the frequency increase. Accordingly, the independent oscillator 37, which, when oscillating, provides a clock signal STIMER with a constant frequency fTIMER, is used for timing both the durations of the over power event and the overcurrent event. The timing results using the oscillator 37 would be more stable and precise, independent from the variation of the compensation voltage VCOM. Therefore, in some embodiments of the invention, the actual lengths of the maximum over power duration and the maximum overcurrent duration would become relatively more precise.

Figure 3A:
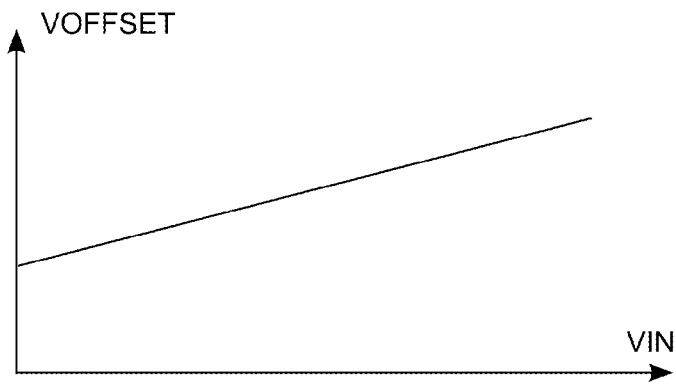
FIG. 3A shows the relationship between the offset signal VOFFSET employed in overcurrent protection and the voltage of the line power source VIN.

FIG. 3A shows the relationship between the offset signal VOFFSET employed in overcurrent protection and the voltage of the line power source VIN in one embodiment of the invention. The offset signal VOFFSET is in association with the voltage of the line power source VIN at an input terminal of the primary winding PRM. The offset signal VOFFSET varies in response to the voltage of the line power source VIN. Briefly speaking, the higher the voltage of the line power source VIN, the more the offset signal VOFFSET, the earlier the determination of the occurrence of the overcurrent event. By way of the introduction of the offset signal VOFFSET in FIG. 3A, excellent line compensation could be achieved. Good line compensation means that the voltage of the line power source VIN has substantially no or little effect on the value of the loading 15 when an overcurrent event happens. Different embodiments of the invention might utilize different detection methods to detect the voltage of the line power source VIN. For example, the power controller 20 might detect, when the power switch 14 is turned ON, a voltage drop cross an auxiliary winding of the transformer 12 to indirectly detect the voltage of the line power source VIN. In another embodiment, a voltage-dividing circuit connects between the line power source VIN and a ground line, and generates a division voltage in proportion to the voltage of the line power source VIN, to adjust the offset signal VOFFSET. In another embodiment, the offset signal VOFFSET increases along with the increase of the peak voltage of an alternative-current (AC) power source, for excelling the line compensation, where rectification of the AC power source generates the line power source VIN.

Figure 3B:
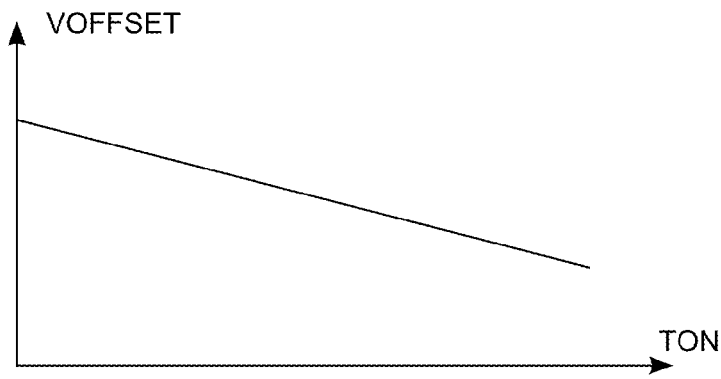
FIG. 3B shows the relationship between the offset signal VOFFSET and the ON time TON.

Good line compensation might be achieved if the offset signal VOFFSET decreases when the ON time TON of the PWM signal SPWM increases, as shown in FIG. 3B. The offset signal VOFFSET varies in response to the ON time TON. In FIG. 3B, the offset signal VOFFSET is in association with the ON time TON, which is the time period when the PWM signal SPWM is "1" in logic, or in other words, the time period when the power switch 14 performs a short circuit. When the output power is kept the same, a shorter ON time TON implies a higher line power source VIN. Therefore, the line compensation that the offset signal VOFFSET of FIG. 3B achieves, if properly designed, could be very close to the one that the offset signal VOFFSET of FIG. 3A does.

In some embodiments of the invention, comparing with those achieved in prior art, the maximum over power duration and the maximum overcurrent duration are more precise, independent from the compensation voltage VCOM. Furthermore, some embodiments of the invention provide relationship between the offset signal VOFFSET and the line power source VIN, or relationship between the offset signal VOFFSET and the ON time TON, to achieve better line compensation.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power controller with over power protection, capable of providing a pulse-width-modulation signal to control a power switch, the power controller comprising:
   a pulse width modulator for generating the pulse-width-modulation signal;
   a first oscillator, coupled to the pulse width modulator, for determining a cycle time of the pulse-width-modulation signal;
   a second oscillator, independent from the first oscillator, for determining a maximum over power duration when the cycle time is determined by the first oscillator; and
   an over power detector for detecting an occurrence of an over power event;
   wherein when the over power event lasts for the maximum over power duration, the pulse-width-modulation signal switches OFF the power switch constantly;
   wherein the first oscillator is controlled by a compensation voltage in association with an output power of a power supply;
   wherein when the compensation voltage is about a preset over-power voltage, the first oscillator provides a first constant frequency;
   when the compensation voltage exceeds the preset over-power voltage, the first oscillator provides a second constant frequency higher than the first constant frequency; and
   the occurrence of the over power event is determined by comparing the preset over-power voltage and the compensation voltage.

2. The power controller as claimed in claim 1, wherein the over power detector comprises a comparator comparing the compensation voltage with a preset over-power voltage.

3. The power controller as claimed in claim 1, wherein the second oscillator oscillates only when the compensation voltage exceeds a predetermined value.

4. The power controller as claimed in claim 1, further comprising:
a counter, for timing a lasting of the over power event according to the second oscillator.

5. The power controller as claimed in claim 1, further comprising:
an overcurrent detector for detecting an occurrence of an overcurrent event;
wherein the second oscillator determines a maximum overcurrent duration; and
when the overcurrent event lasts for the maximum overcurrent duration, the pulse-width-modulation signal switches OFF the power switch constantly.

6. The power controller as claimed in claim 5, wherein the overcurrent detector compares a current limiting signal with a current sense signal substantially representing a current flowing through an inductive device.

7. The power controller as claimed in claim 6, wherein when a sum of the current sense signal and an offset signal exceeds the current limiting signal, the overcurrent detector determines the overcurrent event is happening.

8. The power controller as claimed in claim 5, further comprising:
an over power counter and an overcurrent counter, both coupled to the second oscillator, for timing a lasting of the over power event and the lasting of the overcurrent event, respectively, according to the second oscillator;
wherein the maximum overcurrent duration is shorter than the maximum over power duration.

9. The power controller as claimed in claim 1, wherein the second oscillator provides a second oscillation signal with the second constant frequency independent to the compensation voltage when the cycle time varies in response to the compensation voltage.

10. A control method for a switched mode power supply with a power switch, comprising:
providing a pulse-width-modulation signal to control the power switch;
providing a first oscillation signal for determining a cycle time of the pulse-width-modulation signal;
detecting an occurrence of an over power event;
providing a second oscillation signal independent from the first oscillation signal, to determine a maximum over power duration when the cycle time is determined by the first oscillation signal;
detecting whether the over power event lasts for the maximum over power duration;
constantly switching OFF the power switch when the over power event lasts for the maximum over power duration;
controlling the first oscillation signal using a compensation voltage;
wherein the compensation voltage is controlled by an output power source of the switched mode power supply;
wherein when the compensation voltage is about a preset over-power voltage, the first oscillator provides a first constant frequency;
when the compensation voltage exceeds the preset over-power voltage, the first oscillator provides a second constant frequency higher than the first constant frequency; and
the occurrence of the over power event is determined by comparing the preset over-power voltage and the compensation voltage.

11. The control method as claimed in claim 10, further comprising:
comparing the compensation voltage with the preset over-power voltage to determining the occurrence of the over power event.

12. The control method as claimed in claim 10, further comprising:
stopping providing the second oscillation signal if the compensation voltage is less than a predetermined value; and
providing the second oscillation signal if the compensation voltage exceeds the predetermined value;
wherein the cycle time of the second oscillation signal is about a constant when the compensation voltage exceeds the predetermined value.

13. The control method as claimed in claim 10, further comprising: using the second oscillation signal as a clock for timing the lasting of the over power event.

14. The control method as claimed in claim 10, further comprising:
detecting an occurrence of an overcurrent event;
providing the second oscillation signal to determine a maximum overcurrent duration;
detecting whether the overcurrent event lasts for the maximum overcurrent duration; and
constantly switching OFF the power switch when the over power event lasts for the maximum overcurrent duration.

15. The control method as claimed in claim 14, further comprising:
comparing a current limiting signal with a current-sense signal substantially representing a current flowing through an inductive device.

16. The control method as claimed in claim 15, further comprising:
comparing the current limiting signal with a sum of the current sense signal and an offset signal, to determine the occurrence of the overcurrent event.

17. The control method as claimed in claim 16, further comprising: associating the offset signal to an input voltage at an input terminal of the inductive device.

18. The control method as claimed in claim 16, further comprising: associating the offset signal to an ON time of the pulse-width-modulation signal.

19. The control method as claimed in claim 10, wherein the second oscillation signal has the second constant frequency independent to the compensation voltage when the cycle time varies in response to the compensation voltage.

* * * * *